United States Patent
Hwang et al.

(10) Patent No.: US 11,448,943 B2
(45) Date of Patent: Sep. 20, 2022

(54) APPARATUS FOR STABILIZING CAMERA OF AUTONOMOUS VEHICLE AND METHOD THEREOF

(71) Applicants: HYUNDAI MOTOR COMPANY, Seoul (KR); KIA MOTORS CORPORATION, Seoul (KR)

(72) Inventors: Sang Woo Hwang, Seoul (KR); Young Dae Park, Asan-si (KR); Byung Rim Lee, Seongnam-si (KR); Min Jun Kim, Busan (KR); Se Hyun Chang, Suwon-si (KR); Hyeon Seok Cho, Pyeongtaek-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 102 days.

(21) Appl. No.: 16/920,942

(22) Filed: Jul. 6, 2020

(65) Prior Publication Data
US 2021/0141294 A1 May 13, 2021

(30) Foreign Application Priority Data
Nov. 12, 2019 (KR) .................. 10-2019-0144600

(51) Int. Cl.
*G03B 17/56* (2021.01)
*B60R 11/04* (2006.01)
*G05D 1/00* (2006.01)

(52) U.S. Cl.
CPC ............ *G03B 17/561* (2013.01); *B60R 11/04* (2013.01); *B60R 2300/108* (2013.01); *G05D 1/0088* (2013.01)

(58) Field of Classification Search
CPC ....................................................... B60R 11/04
See application file for complete search history.

(56) References Cited

U.S. PATENT DOCUMENTS

| | | | | |
|---|---|---|---|---|
| 4,910,591 | A * | 3/1990 | Petrossian | B60R 11/04 348/148 |
| 8,000,588 | B1 * | 8/2011 | Harvey | G03B 17/00 396/12 |
| 10,976,647 | B2 * | 4/2021 | Liao | G03B 15/006 |

* cited by examiner

*Primary Examiner* — Noam Reisner
(74) *Attorney, Agent, or Firm* — Lempia Summerfield Katz LLC

(57) ABSTRACT

An apparatus for stabilizing a camera of an autonomous vehicle includes: a sensor that detects vibration generated and applied to the camera due to a state of a road surface when the autonomous vehicle is traveling; a first actuator that attenuates roll vibration applied to the camera; a second actuator that attenuates pitch vibration applied to the camera; and a controller that controls the first actuator and the second actuator to attenuate the vibration detected by the sensor.

11 Claims, 7 Drawing Sheets

APPARATUS FOR STABILIZING CAMERA OF AUTONOMOUS VEHICLE AND METHOD THEREOF

CROSS-REFERENCE TO RELATED APPLICATION

This application claims priority to and the benefit of Korean Patent Application No. 10-2019-0144600, filed on Nov. 12, 2019, the entire contents of which are incorporated herein by reference.

FIELD

The present disclosure relates to technologies of stabilizing a camera provided in an autonomous vehicle.

BACKGROUND

The statements in this section merely provide background information related to the present disclosure and may not constitute prior art.

In general, an autonomous vehicle may recognize surrounding situations using various sensors. Such various sensors may include a camera, a light detection and ranging (LiDAR) sensor, a radar sensor, an ultrasonic sensor, and the like. The respective sensors may be responsible for different roles depending on corresponding characteristics. Particularly, the camera may be a sensor which plays an important role in providing images desired for an autonomous controller to recognize a lane on the road or recognize traffic signals.

Such a camera may be fixed (attached) to a front windshield to look ahead of the autonomous vehicle such that when the autonomous vehicle is traveling, vibration caused by the road surface is applied to the camera, and the camera may capture a low quality image (e.g., an image which is out of focus).

Furthermore, the camera may have a limited viewing angle depending on the behavior of the vehicle. In other words, when the autonomous vehicle drives up the hill, the camera may lean toward the air in an image capture area rather than the road surface when the autonomous vehicle drives up the hill than when the autonomous vehicle travels on the flatland and may lean toward an excessive short-range road surface in an image capture area when the autonomous vehicle drives down the hill than when the autonomous vehicle travels on the flatland, thus not providing images desired for smooth autonomous driving.

Furthermore, when an obstruction light source, such as the strong light of the sun, is directly emitted to the camera, the camera may fail to capture normal forward images. Due to this, the autonomous controller does not obtain information desired for autonomous driving from the forward image, and this may result in an accident.

SUMMARY

The present disclosure has been made to solve the above-mentioned problems occurring in the prior art while advantages achieved by the prior art are maintained intact.

An aspect of the present disclosure provides an apparatus for stabilizing a camera of an autonomous vehicle to detect vibration generated and applied to the camera due to a state of a road surface when the autonomous vehicle is traveling and attenuate the detected vibration using a plurality of actuators such that the camera may always capture a clear quality image irrespective of a behavior of the autonomous vehicle and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus may include: a sensor that detects vibration generated and applied to the camera when the autonomous vehicle is traveling, a first actuator that attenuates roll vibration applied to the camera, a second actuator that attenuates pitch vibration applied to the camera, and a controller that controls the first actuator and the second actuator to attenuate the vibration detected by the sensor.

Herein, the controller may control a third actuator to move the camera from a holder to a reference location, when the autonomous vehicle is turned on. In this case, the controller may control the third actuator to return the camera to an original location, when abnormality occurs in the second actuator or the third actuator.

Furthermore, the controller may control the third actuator to move the camera to a location where it is able to block direct light by a shade, when the direct light affects an image captured by the camera.

Furthermore, the controller may control the second actuator such that an image capture direction of the camera becomes upward when the autonomous vehicle drives down a hill and may control the second actuator such that the image capture direction of the camera becomes downward when the autonomous vehicle drives up the hill.

Furthermore, the first actuator may be positioned on one side of the camera and the second actuator is positioned on a rear surface of the camera. The first actuator may be positioned on a front surface of a support to move along the support in an upward and downward direction by the third actuator located on a rear surface of the support. An upper end of the support may be fixed to a windshield. A shade may be attached to one side of the upper end of the support and a holder is attached to one side of a lower end of the support.

Herein, the support may be equipped with a rack. The third actuator may rotate a pinion to move the first actuator, the camera, and the second actuator in an upper and downward direction at the same time. In this case, each of the first actuator and the second actuator may include a coaxial attenuator.

According to another aspect of the present disclosure, a method may include: detecting, by a sensor, vibration generated and applied to the camera when the autonomous vehicle is traveling, controlling, by a controller, a first actuator and a second actuator to attenuate the vibration detected by the sensor, attenuating, by the first actuator, roll vibration applied to the camera, and attenuating, by the second actuator, pitch vibration applied to the camera.

The method may further include controlling, by the controller, the third actuator to upwardly move the camera fixed into a holder to a reference location, when the autonomous vehicle is turned on and controlling, by the controller, the third actuator to return the camera to an original location, when abnormality occurs in the first actuator or the second actuator.

The method may further include controlling, by the controller, the third actuator to move the camera to a location where it is able to block direct light by a shade, when the direct light affects an image captured by the camera.

Herein, the attenuating of the pitch vibration applied to the camera may include upwardly moving an image capture direction of the camera, when the autonomous vehicle drives down a hill and downwardly moving the image capture direction of the camera, when the autonomous vehicle drives up the hill.

According to another aspect of the present disclosure, a method may include: controlling, by a controller, a first actuator to upwardly move the camera fixed into a holder to a reference location, when the autonomous vehicle is turned on; controlling, by the controller, the first actuator to return the camera to an original location, when abnormality occurs in a second actuator or a third actuator; controlling, by the controller, the first actuator to move the camera to a location where it is able to block direct light by a shade, when the direct light is included in an image captured by the camera; detecting, by a sensor, vibration generated and applied to the camera when the autonomous vehicle is traveling; controlling, by the controller, the second actuator and the third actuator to attenuate the vibration detected by the sensor; attenuating, by the second actuator, roll vibration applied to the camera; and attenuating, by the third actuator, pitch vibration applied to the camera.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
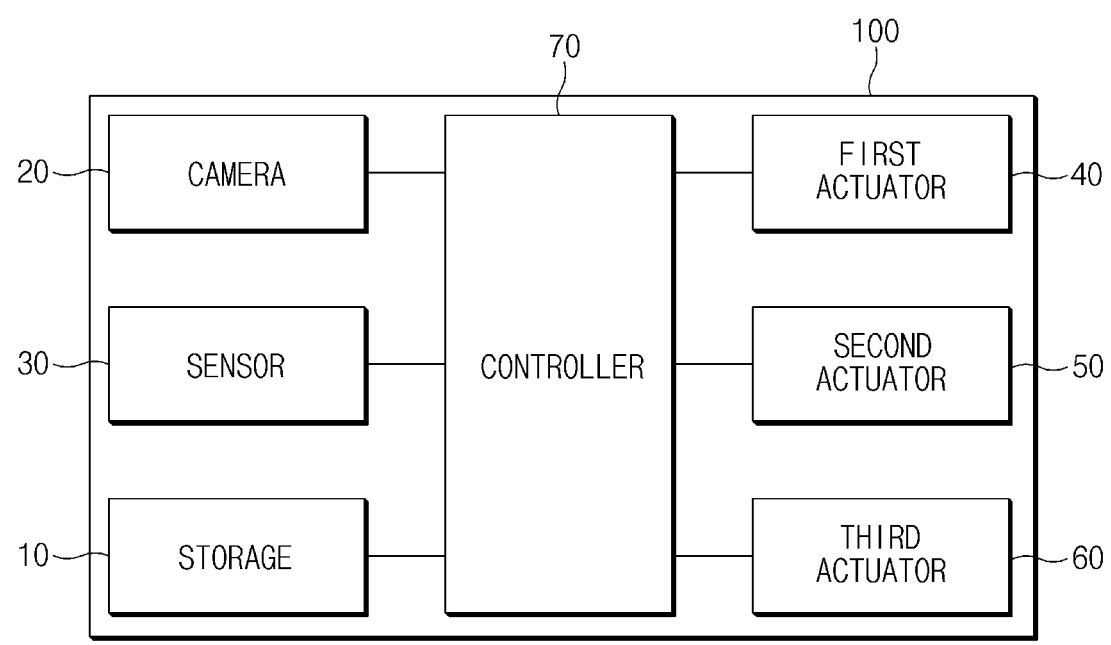
FIG. 1 is a block diagram illustrating a configuration of an apparatus for stabilizing a camera of an autonomous vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of well-known features or functions will be ruled out in order not to unnecessarily obscure the gist of the present disclosure.

In describing the components of the forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for stabilizing a camera of an autonomous vehicle according to one form of the present disclosure.

As shown in FIG. 1, an apparatus 100 for stabilizing a camera of an autonomous vehicle may include: a storage 10, a camera 20, a sensor 30, a first actuator 40, a second actuator 50, a third actuator 60, and a controller 70. In this case, the respective components may be combined into one component and some components may be omitted, depending on a manner which executes the apparatus 100 for stabilizing the camera of the autonomous vehicle according to one form of the present disclosure.

Seeing the respective components, first of all, the storage 10 may store various logics, algorithms, and programs, which are desired in a process of detecting vibration generated and applied to the camera 20 due to a state (e.g., a bump) of a road surface when the autonomous vehicle is traveling and attenuating the detected vibration using the plurality of actuators 50 and 60.

The storage 10 may store an image processing algorithm used to determine whether direct light is present in an image captured by the camera 20 (whether direct light is partially introduced into a lens of the camera 20).

The storage 10 may store location information for moving the camera 20 to avoid the direct light when the direct light is present in the image captured by the camera 20.

The storage 10 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The camera 20 may be a kind of sensor provided in the autonomous vehicle to capture an image including a variety of information desired for autonomous driving, which may be a module which is an entity of stabilization in one form of the present disclosure.

The sensor 30 may be a module for detecting vibration generated and applied to the camera 20 due to a state of a road surface when the autonomous vehicle is travelling, which may include a gyro sensor, an acceleration sensor, and the like. In one form, the gyro sensor and the acceleration sensor may be separately provided, but gyro sensor and an acceleration sensor previously provided in the autonomous vehicle may be used.

The first actuator 40 may play a role in moving the camera 20 up/down under control of the controller 70.

The second actuator 50 may rotate the camera 20 in a clockwise or counterclockwise direction under control of the controller 70 to attenuate roll vibration generated and applied to the camera 20 due to a state of a road surface when the autonomous vehicle is traveling. In this case, the second actuator 50 may include a coaxial attenuator.

The third actuator 60 may rotate the camera 20 in an upward/downward direction under control of the controller 70 to attenuate pitch vibration generated and applied to the camera 20 due to a state of a road surface when the autonomous vehicle is traveling. In this case, the third actuator 60 may include a coaxial attenuator.

The controller 70 may perform overall control such that the respective components normally perform their own functions. Such a controller 70 may be implemented in the form of hardware or software or in the form of a combination thereof. In one form, the controller 70 may be implemented as, but not limited to, a microprocessor.

When the autonomous vehicle is turned on (enters a stage ready for driving), the controller 70 may control the first actuator 40 to move the camera 20 from a holder 230 to a reference location.

The controller 70 may control the second actuator 50 and the third actuator 60 to detect vibration generated and applied to the camera 20 due to a state of a road surface when the autonomous vehicle is traveling and attenuate the detected vibration.

The controller 70 may determine whether an image captured by the camera 20 includes direct light. When the image includes the direct light, the controller 70 may control the first actuator 40 to move the camera 20 to a location (a predetermined location) where it is able to block the direct light by a shade. In this case, when the number of pixels having a brightness value greater than a first reference value (e.g., 250) in the image captured by the camera 20 is greater than a second reference value (e.g., 128×96), the controller 70 may determine that the direct light is present in the image.

Hereinafter, the operation of the controller 70 will be given in detail with reference to FIGS. 2 to 5.

Figure 2:
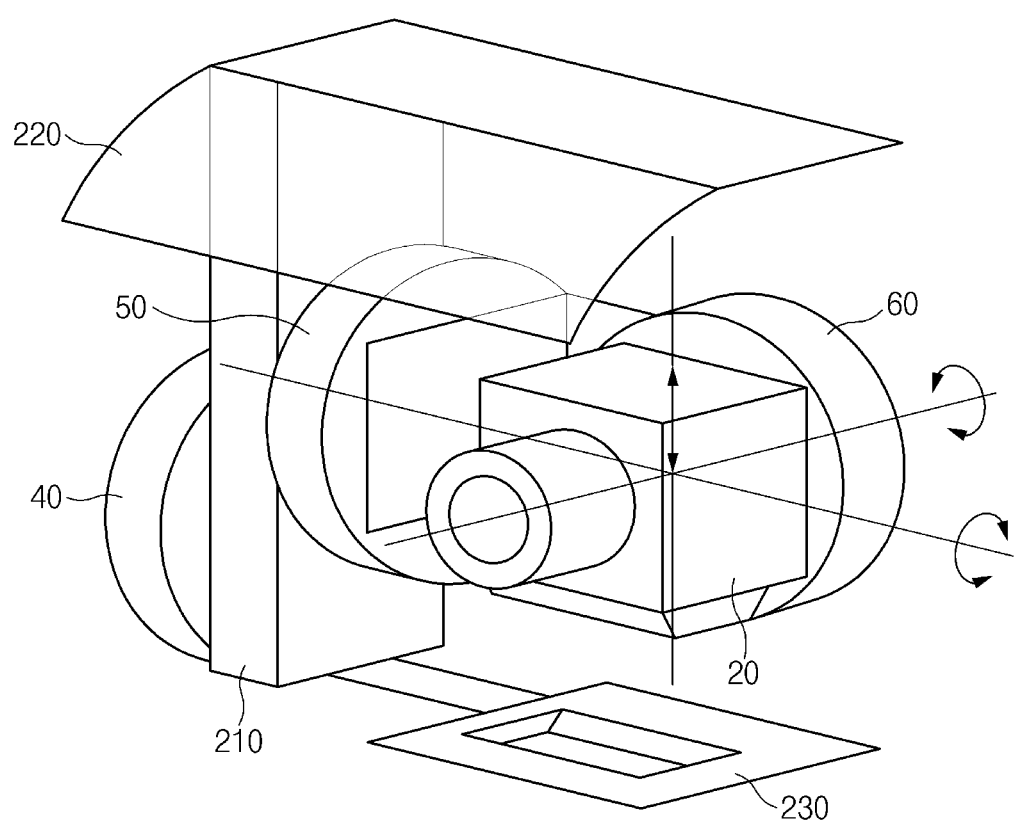
FIG. 2 is a drawing illustrating a structure of an apparatus for stabilizing a camera of an autonomous vehicle according to one form of the present disclosure.

FIG. 2 is a drawing illustrating a structure of an apparatus for stabilizing a camera of an autonomous vehicle according to one form of the present disclosure.

As shown in FIG. 2, a second actuator 50 for attenuating pitch vibration applied to a camera 20 may be positioned on one side of the camera 20, and a third actuator 60 for attenuating roll vibration applied to the camera 20 may be positioned on a rear surface of the camera 20.

The second actuator 50 may be located on a front surface of a support 210 to move along the support 210 in an upward/downward direction by a first actuator 40. In this case, an upper end of the support 210 may be fixed to a windshield, and a shade 220 may be attached to one side of the upper end of the support 210 and a holder 230 for fixing the camera 20 when the camera 20 is not operated may be attached to one side of a lower end of the support 210.

The first actuator 40 may be positioned on a rear surface of the support 210. The first actuator 40 may move the second actuator 50, the camera 20, and the third actuator 60 along the support 210 in an upward/downward direction. In this case, the support 210 may be equipped with a rack (not shown), and the first actuator 40 may rotate a pinion (not shown) to move the second actuator 50, the camera 20, and the third actuator 60 at the same time.

Figure 3A:
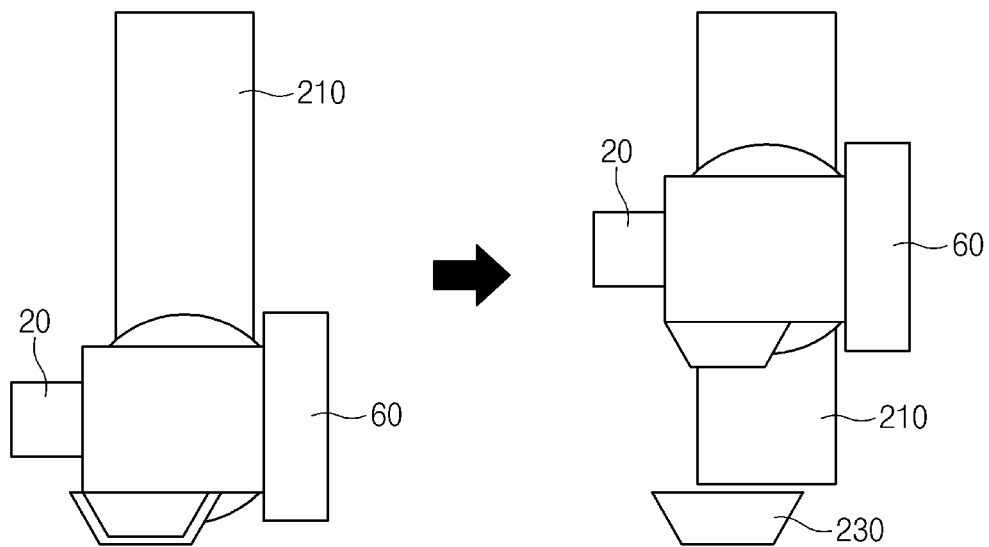
FIGS. 3A and 3B are drawings respectively illustrating a process of controlling a first actuator by a controller provided in an apparatus for stabilizing a camera of an autonomous vehicle in one form of the present disclosure.
Figure 3B:
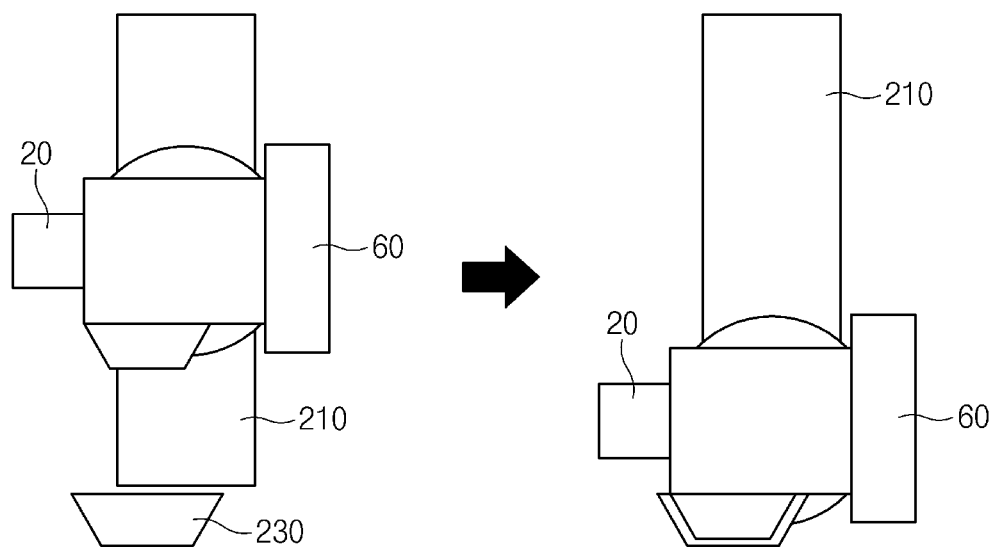

FIGS. 3A and 3B are drawings illustrating a process where a controller provided in an apparatus for stabilizing a camera of an autonomous vehicle controls a first actuator, according to one form of the present disclosure.

As shown in FIG. 3A, in a state where the autonomous vehicle is turned off or where an apparatus 100 for stabilizing a camera is turned off, a camera 20 may be fitted and fixed into a holder 230.

When the autonomous vehicle is turned on (enters a stage ready for driving), a controller 70 of FIG. 1 may control a first actuator 40 to move the camera 20, which had been fitted and fixed into the holder 230, to a reference location.

Furthermore, as shown in FIG. 3B, when abnormality occurs in the second actuator 50 or the third actuator 60, the controller 70 may control the first actuator 40 to return the camera 20, which has been moved to the reference position, to an original location.

Figure 4:
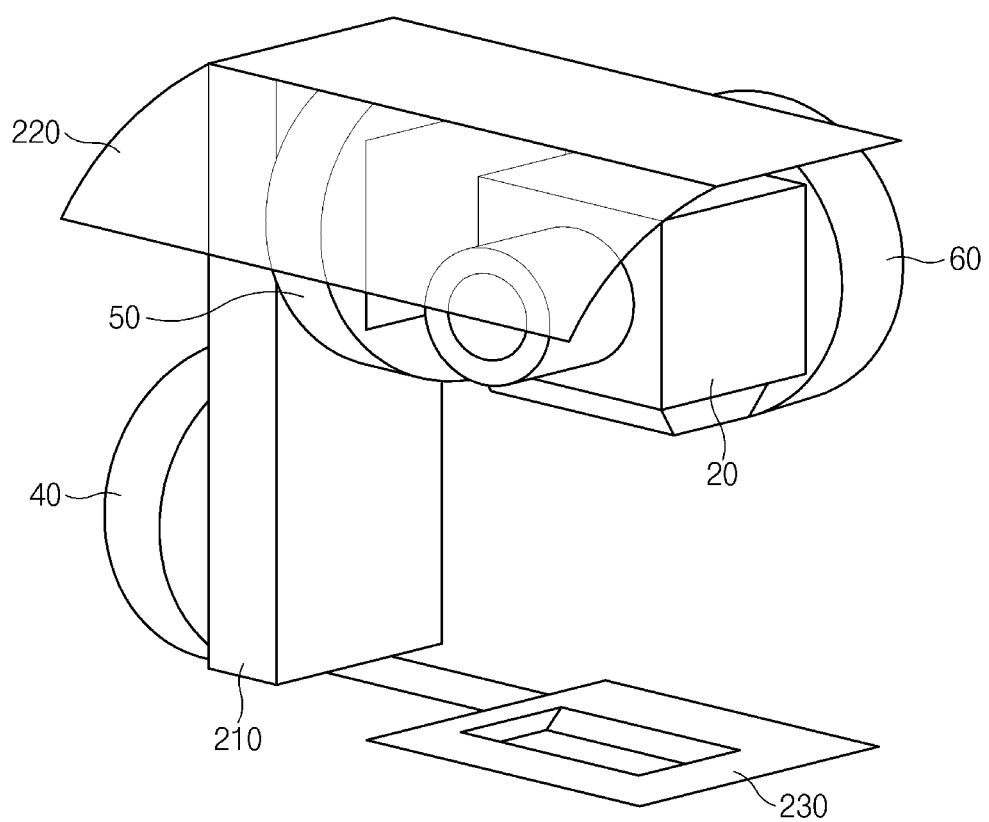
FIG. 4 is another drawing illustrating another process of controlling a first actuator by a controller provided in an apparatus for stabilizing a camera of an autonomous vehicle in another form of the present disclosure.

FIG. 4 is another drawing illustrating a process where a controller provided in an apparatus for stabilizing a camera of an autonomous vehicle controls a first actuator, according to another form of the present disclosure.

As shown in FIG. 4, when direct light is included in an image captured by a camera 20 at a reference location, a controller 70 of FIG. 1 may control a first actuator 40 to move the camera 20 to a location (a predetermined location) where it is able to avoid the direct light by a shade 220.

Figure 5:
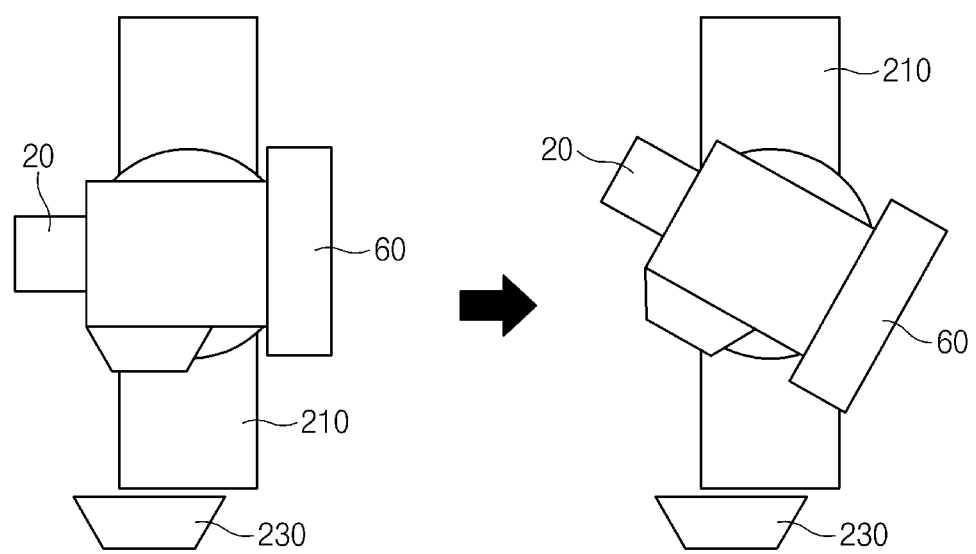
FIG. 5 is a drawing illustrating a process of controlling a second actuator by a controller provided in an apparatus for stabilizing a camera of an autonomous vehicle in one form of the present disclosure.

FIG. 5 is a drawing illustrating a process where a controller provided in an apparatus for stabilizing a camera of an autonomous vehicle controls a second actuator, according to one form of the present disclosure.

When the autonomous vehicle drives down a hill (e.g., a slope), to provide a viewing angle of a camera 20, as shown in FIG. 5, a controller 70 of FIG. 1 may control a third actuator 60 such that an image capture direction of the camera 20 becomes upward. In this case, an upward angle may be set to an angle corresponding to a gradient of the hill or may be set to a reference upward angle.

On the other hand, when the autonomous vehicle drives up the hill, the controller 70 may control the third actuator 60 such that an image capture direction of the camera 20 becomes downward. In this case, a downward angle may be set to an angle corresponding to a gradient of the hill or may be set to a reference downward angle.

Figure 6:
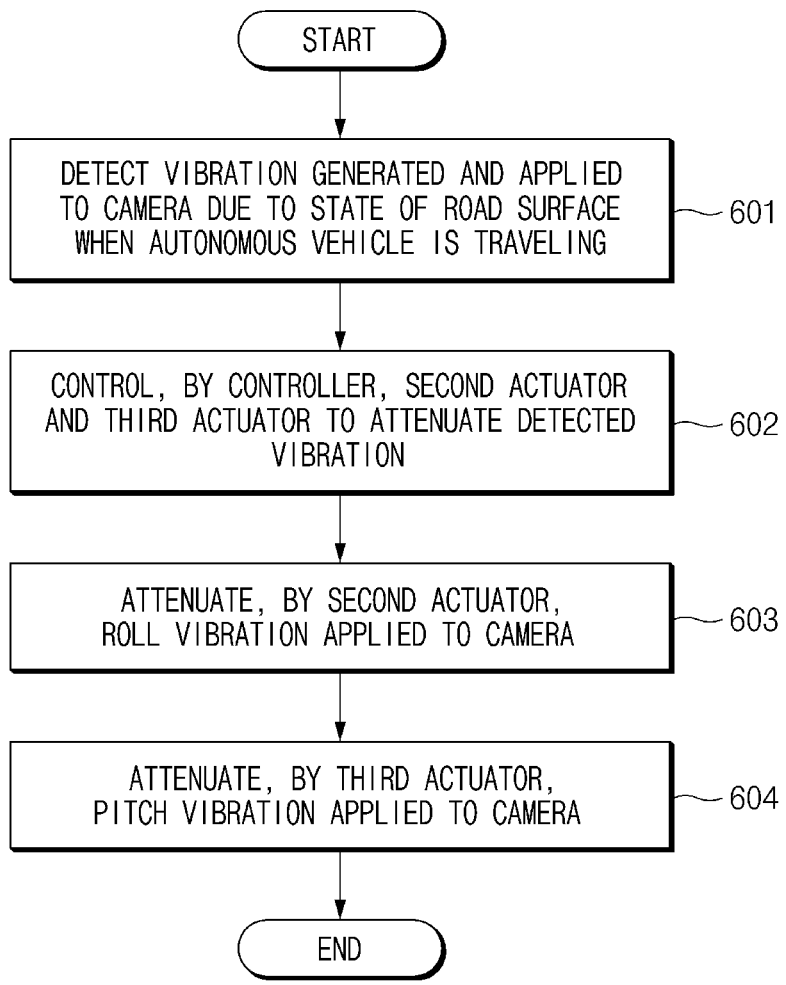
FIG. 6 is a flowchart illustrating a method for stabilizing a camera of an autonomous vehicle in one form of the present disclosure.

FIG. 6 is a flowchart illustrating a method for stabilizing a camera of an autonomous vehicle according to one form of the present disclosure.

First of all, in operation 601, a sensor 30 of FIG. 1 may detect vibration generated and applied to a camera 20 of FIG. 1 due to a state of a road surface when the autonomous vehicle is traveling.

In operation 602, a controller 70 of FIG. 1 may control a second actuator 50 and a third actuator 60 of FIG. 1 to attenuate the vibration detected by the sensor 30.

In operation 603, the second actuator 50 may attenuate roll vibration applied to the camera 20.

In operation 604, the third actuator 60 may attenuate pitch vibration applied to the camera 20.

Figure 7:
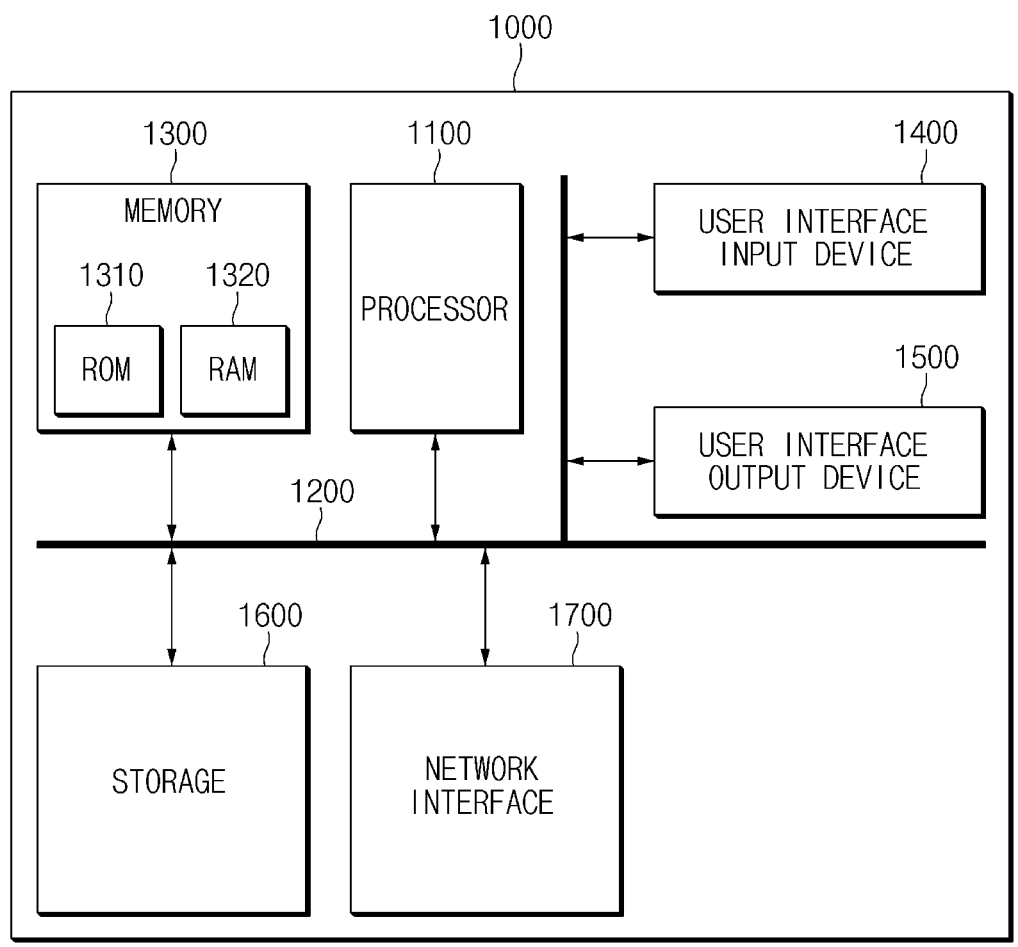
FIG. 7 is a block diagram illustrating a computing system for executing a method for stabilizing a camera of an autonomous vehicle according to one form of the present disclosure.

FIG. 7 is a block diagram illustrating a computing system for executing a method for stabilizing a camera of an autonomous vehicle according to another form of the present disclosure.

Referring to FIG. 7, the method for stabilizing the camera of the autonomous vehicle may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus for stabilizing the camera of the autonomous vehicle and the method thereof may detect vibration generated and applied to the camera due to a state of a road surface when the autonomous vehicle is traveling and may attenuate the detected vibration using a plurality of actuators, such that the camera may always capture a clear quality image irrespective of a behavior of the autonomous vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for stabilizing a camera of an autonomous vehicle, the apparatus comprising:
   a sensor configured to detect vibration generated and applied to the camera when the autonomous vehicle is traveling;
   a first actuator configured to attenuate roll vibration applied to the camera;
   a second actuator configured to attenuate pitch vibration applied to the camera;
   a third actuator configured to vertically move the camera; and
   a controller configured to:
      control the first actuator and the second actuator to attenuate the vibration detected by the sensor,
      control the third actuator to move the camera from a holder to a reference location, when the autonomous vehicle is turned on, and
      control the third actuator to return the camera to an original location, when abnormality occurs in the first actuator or the second actuator.

2. The apparatus of claim 1, wherein the controller is configured to:
   control the second actuator such that an image capture direction of the camera becomes upward when the autonomous vehicle drives down a hill, and
   control the second actuator such that the image capture direction of the camera becomes downward when the autonomous vehicle drives up the hill.

3. An apparatus for stabilizing a camera of an autonomous vehicle, the apparatus comprising:
   a sensor configured to detect vibration generated and applied to the camera when the autonomous vehicle is traveling;
   a first actuator configured to attenuate roll vibration applied to the camera;
   a second actuator configured to attenuate pitch vibration applied to the camera;
   a third actuator configured to vertically move the camera; and
   a controller configured to control the first actuator and the second actuator to attenuate the vibration detected by the sensor,
   wherein the controller is configured to control the third actuator to move the camera to a location where a shade of the apparatus blocks direct light, when the direct light affects an image captured by the camera.

4. An apparatus for stabilizing a camera of an autonomous vehicle, the apparatus comprising:
   a sensor configured to detect vibration generated and applied to the camera when the autonomous vehicle is traveling;
   a first actuator configured to attenuate roll vibration applied to the camera;
   a second actuator configured to attenuate pitch vibration applied to the camera;
   a third actuator configured to vertically move the camera; and
   a controller configured to control the first actuator and the second actuator to attenuate the vibration detected by the sensor,
   wherein:
   the first actuator is positioned on one side of the camera and the second actuator is positioned on a rear surface of the camera,
   the first actuator is positioned on a front surface of a support to move along the support in an upward and downward direction by the third actuator located on a rear surface of the support,
   an upper end of the support is fixed to a windshield, and
   a shade is attached to one side of the upper end of the support and a holder is attached to one side of a lower end of the support.

5. The apparatus of claim 4, wherein the support is equipped with a rack, and wherein the third actuator is configured to rotate a pinion to move the first actuator, the camera, and the second actuator in an upper and downward direction at the same time.

6. The apparatus of claim 4, wherein each of the first actuator and the second actuator includes a coaxial attenuator.

7. A method for stabilizing a camera of an autonomous vehicle, the method comprising:
- detecting, by a sensor, vibration generated and applied to the camera when the autonomous vehicle is traveling;
- controlling, by a controller, a first actuator and a second actuator to attenuate the detected vibration;
- attenuating, by the first actuator, roll vibration applied to the camera;
- attenuating, by the second actuator, pitch vibration applied to the camera;
- controlling, by the controller, a third actuator to upwardly move the camera fixed into a holder to a reference location, when the autonomous vehicle is turned on; and
- controlling, by the controller, the third actuator to return the camera to an original location, when abnormality occurs in the first actuator or the second actuator.

8. A method for stabilizing a camera of an autonomous vehicle, the method comprising:
- detecting, by a sensor, vibration generated and applied to the camera when the autonomous vehicle is traveling;
- controlling, by a controller, a first actuator and a second actuator to attenuate the detected vibration;
- attenuating, by the first actuator, roll vibration applied to the camera;
- attenuating, by the second actuator, pitch vibration applied to the camera;
- controlling, by the controller, a third actuator to upwardly move the camera fixed into a holder to a reference location, when the autonomous vehicle is turned on; and
- controlling, by the controller, the third actuator to move the camera to a location where a shade blocks direct light when the direct light affects an image captured by the camera.

9. The method of claim 7, wherein attenuating the pitch vibration includes:
- upwardly moving an image capture direction of the camera, when the autonomous vehicle drives down a hill; and
- downwardly moving the image capture direction of the camera, when the autonomous vehicle drives up the hill.

10. A method for stabilizing a camera of an autonomous vehicle, the method comprising:
- controlling, by a controller, a first actuator to upwardly move the camera fixed into a holder to a reference location, when the autonomous vehicle is turned on;
- controlling, by the controller, the first actuator to return the camera to an original location, when abnormality occurs in a second actuator or a third actuator;
- controlling, by the controller, the first actuator to move the camera to a location where a shade blocks direct light when the direct light affects an image captured by the camera;
- detecting, by a sensor, vibration generated and applied to the camera when the autonomous vehicle is traveling;
- controlling, by the controller, the second actuator and the third actuator to attenuate the detected vibration;
- attenuating, by the second actuator, roll vibration applied to the camera; and
- attenuating, by the third actuator, pitch vibration applied to the camera.

11. The method of claim 10, wherein attenuating the pitch vibration includes:
- upwardly moving an image capture direction of the camera, when the autonomous vehicle drives down a hill; and
- downwardly moving the image capture direction of the camera, when the autonomous vehicle drives up the hill.

* * * * *